US012345812B2

(12) United States Patent
Dai et al.

(10) Patent No.: US 12,345,812 B2
(45) Date of Patent: Jul. 1, 2025

(54) ANGLE OF ROTATION DETERMINATION IN SCANNING LIDAR SYSTEMS

(71) Applicant: Analog Devices International Unlimited Company, Limerick (IE)

(72) Inventors: Yuansheng Dai, Shanghai (CN); Tairan Sun, Shanghai (CN); Tao Yu, Cambridge, MA (US); Libo Meng, Shanghai (CN)

(73) Assignee: Analog Devices International Unlimited Company, Limerick (IE)

( * ) Notice: Subject to any disclaimer, the term of this patent is extended or adjusted under 35 U.S.C. 154(b) by 541 days.

(21) Appl. No.: 17/070,971

(22) Filed: Oct. 15, 2020

(65) Prior Publication Data

US 2021/0208275 A1    Jul. 8, 2021

(30) Foreign Application Priority Data

Jan. 2, 2020    (WO) ................ PCT/CN2020/070095

(51) Int. Cl.
*G01S 17/02* (2020.01)
*G01S 7/48* (2006.01)
(Continued)

(52) U.S. Cl.
CPC ............ *G01S 17/02* (2013.01); *G01S 7/4808* (2013.01); *G01S 7/484* (2013.01); *G01S 7/4861* (2013.01)

(58) Field of Classification Search
CPC ...... G01S 7/4808; G01S 7/484; G01S 7/4861; G01S 7/4817; G01S 7/497; G01S 17/89
See application file for complete search history.

(56) References Cited

U.S. PATENT DOCUMENTS 6,556,282 B2    3/2003  Jamieson et al.
9,658,322 B2    5/2017  Lewis
(Continued)

FOREIGN PATENT DOCUMENTS

CN    108761471    11/2018
CN    110231608     9/2019
(Continued)

OTHER PUBLICATIONS

English Translation (via Patent Translate) of Abstract, Description and Claims for WO2019233499, 44 pages.
(Continued)

*Primary Examiner* — Hwa Andrew Lee
(74) *Attorney, Agent, or Firm* — ArentFox Schiff LLP

(57) ABSTRACT

Systems and methods for determining an angle of the light transmitted by an illumination source of a scanning LIDAR system are disclosed. An example LIDAR system includes a pattern, provided in an optical path of the light transmitted by the illumination source as the light is transmitted out of the system, and configured to reflect at least a portion of the transmitted light to be incident on at least one of one or more optical sensors of the LIDAR system. The LIDAR system further includes, or is associated with, a controller, configured to determine an angle of the transmitted light based on a light detected by at least one of the optical sensors, where at least a portion of the light detected by the optical sensor(s) includes at least a portion of the light transmitted by the illumination source and reflected by the pattern.

16 Claims, 10 Drawing Sheets

(51) Int. Cl.
    *G01S 7/484*     (2006.01)
    *G01S 7/4861*   (2020.01)

(56)     References Cited

U.S. PATENT DOCUMENTS

| | | | |
|---|---|---|---|
| 10,451,716 | B2 | 5/2019 | Hughes et al. |
| 2006/0227317 | A1 | 10/2006 | Henderson et al. |
| 2015/0293228 | A1* | 10/2015 | Retterath ................ G01S 17/10 |
| | | | 356/5.01 |
| 2019/0011249 | A1* | 1/2019 | Watanabe .......... G01B 9/02091 |
| 2019/0154439 | A1 | 5/2019 | Binder |
| 2019/0179028 | A1 | 6/2019 | Pacala et al. |
| 2019/0353758 | A1 | 11/2019 | Shin et al. |
| 2021/0270640 | A1* | 9/2021 | Yasutomi ............. G01D 5/3473 |

FOREIGN PATENT DOCUMENTS

| | | | |
|---|---|---|---|
| EP | 2738572 | | 6/2014 |
| KR | 20200022958 | * | 2/2020 ............. G01S 7/481 |
| WO | 2019233499 | | 12/2019 |

OTHER PUBLICATIONS

English Translation (via Patent Translate) of Abstract, Description and Claims for CN108761471, 37 pages.
English Translation (via Patent Translate) of Abstract, Description and Claims for CN110231608, 11 pages.

* cited by examiner

ANGLE OF ROTATION DETERMINATION IN SCANNING LIDAR SYSTEMS

CROSS REFERENCE TO RELATED APPLICATIONS

This application claims the benefit of and priority from an International Application No. PCT/CN2020/070095, filed Jan. 2, 2020, titled "ANGLE OF ROTATION DETERMINATION IN SCANNING LIDAR SYSTEMS," the disclosure of which is hereby incorporated by reference herein in its entirety.

TECHNICAL FIELD OF THE DISCLOSURE

The present disclosure relates generally to electronics and, more specifically, to light detection and ranging (LIDAR) systems.

BACKGROUND

LIDAR refers to a surveying method that measures distance to a target object by illuminating the object with light (e.g., with pulses of light, e.g., pulses of laser light) and measuring the reflected light with one or more optical sensors such as Avalanche Photo Diodes (APDs). Differences in laser return times and wavelengths can then be used to determine the distance to the object and/or make digital three-dimensional representations of the object. LIDAR systems are used in a variety of situations, for example in numerous and diverse automotive, industrial, and military applications.

LIDAR systems and methods are known that employ an illumination source to direct pulsed beams of light toward a target object within a field-of-view (FOV), and a light detector array to receive light reflected from the target object. For each pulsed beam of light directed toward the target object, the light detector array can receive reflected light corresponding to a frame of data. Further, using one or more frames of data, the range or distance to the target object can be obtained by determining the elapsed time between transmission of the pulsed beam of light by the illumination source and reception of the reflected light at the light detector array.

Scanning, or spinning, LIDAR systems is one class of LIDAR systems where the light emitted by an illumination source is rotated to scan objects that would be outside of a FOV of a single light beam. In all scanning LIDAR systems, it is necessary to know the angular position of the light transmitted by the illumination source out of the system. Determining the angle of rotation of the transmitted light is not an easy task because a variety of factors can affect the cost, quality and robustness of the angle determination. Physical constraints such as space/surface area and also regulations can pose further constraints to the requirements or specifications for the angle determination in scanning LIDAR systems. Thus, trade-off and ingenuity have to be exercised in designing arrangements for determining angles of rotations in scanning LIDAR systems.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described in the present disclosure are set forth in the description below and the accompanying drawings.

Various aspects of the present disclosure relate to using patterns for determining an angle of the light transmitted by a LIDAR illumination source of a scanning LIDAR system. For purposes of illustrating the use of patterns in scanning LIDAR systems as described herein, it might be useful to first understand settings in which such angles may need to be determined, as well as phenomena that may come into play when LIDAR systems are operating. The following foundational information may be viewed as a basis from which the present disclosure may be properly explained. Such information is offered for purposes of explanation only and, accordingly, should not be construed in any way to limit the broad scope of the present disclosure and its potential applications.

Figure 1:
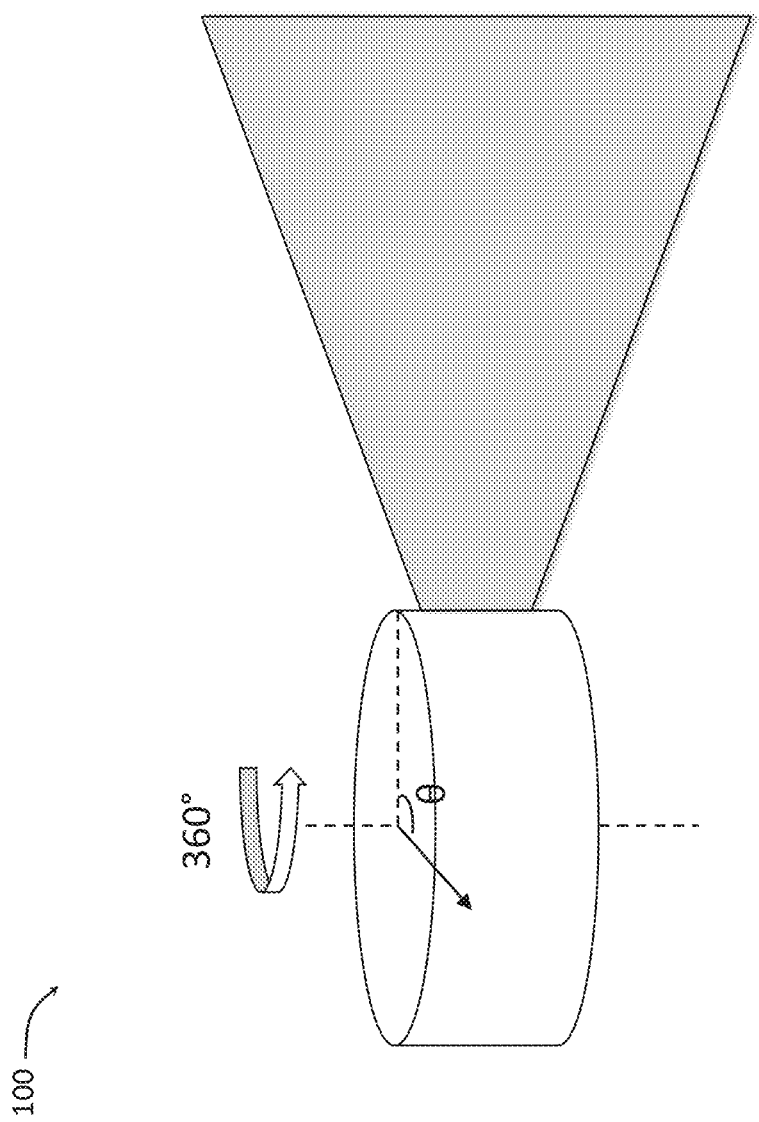
FIG. 1 is a schematic illustration of angles of rotation of a scanning LIDAR module.

Normally, a solid-state flash LIDAR system can only get the distance information with a fixed FOV, as schematically illustrated in FIG. 1. If it needs to draw the point cloud of a wider FOV, the LIDAR system can be rotated/spinned, as also indicated in FIG. 1 with a rotation that may span the entire 360 degrees.

A conventional scanning LIDAR system can include an illumination source, a light detector array, and a controller. The illumination source can include a single illuminator (e.g., a laser) or an array of illuminators, and the light detector array can include an array of pixel receiver elements (e.g., APDs or other photodiodes). In a typical mode of operation, the illumination source and the light detector array may be arranged in fixed positions with respect to one another and the controller may rotate the arrangement of the illumination source and the light detector array up to 360 degrees in order to illuminate the desired FOV and receive light reflected from various objects. Alternatively or additionally to rotating the arrangement of the illumination source and the light detector array, the scanning LIDAR system may include a moveable mirror, and the controller may move the mirror in order to sweep the pulsed beams of light and illuminate the desired FOV up to 360 degrees. While illuminating the FOV and receiving the reflected light, the scanning LIDAR system can obtain a frame of data for each pulsed beam of light produced by the illumination source, and, using the frames of data, determine range information pertaining to the distance to one or more target objects.

In all scanning LIDAR systems, it is necessary to know the angular position of the light transmitted by the illumination source out of the system (e.g., the rotation angle such as the angle $\theta$ shown in FIG. 1), for each pulsed beam being processed. Determining this angular position is not trivial, e.g., because the mechanical structure of a scanning LIDAR system may be difficult to keep stable all the time, which may cause the unstable rotating velocity of the system. In conventional scanning LIDAR systems, one or more external sensors, such as a counter, a gyroscope, and/or an optical sensor are used to determine the angular position of the transmitted light. For example, in some conventional scanning LIDAR systems, angle measurements (goniometry) are done using a code wheel, which may be expensive due to calibration, maintenance and added system complexity. In other conventional scanning LIDAR systems, gear-based angle measurement approaches have been used but those could be less mechanically reliable. Optical-based angle measurement approaches have also been proposed in the past but those often require additional light sources and light detectors.

It would be desirable to have another approach to determining angle of rotation in scanning LIDAR systems that may improve on one or more of these drawbacks.

Embodiments of the present disclosure provide arrangements for determining angles of rotations in scanning LIDAR systems, and associated methods and devices. As used herein, the term "angle of rotation" refers to an angle at which the light generated by an illumination source of a scanning LIDAR system is transmitted out of the LIDAR system.

One aspect of the present disclosure provides a LIDAR system that includes at least an illumination source configured to emit light, one or more optical sensors configured to detect light incident thereon, and a LIDAR controller configured to control performance of various functions described herein. The illumination source is configured to emit light to be reflected from a target object so at least a portion of the reflected light is detected by the one or more optical sensors. Based on the light detected by the one or more optical sensors, the LIDAR controller may determine one of more of a distance to the target object, a velocity of the target object, and a three-dimensional representation of at least a portion of the target object. The LIDAR system may include means to change the angle of the light generated by the illumination source (e.g., to change the angle of the light emitted by the illumination source), e.g., by virtue of the illumination source being included in a scanning LIDAR system and/or by the use of one or more mirrors (e.g., one or more film mirrors, Galvo or micro-electro-mechanical (MEMS) mirrors, polygon mirrors, etc.), one or more prisms (e.g., one or more rotating prisms, Riley prisms, etc.), and/or one or more lenses (e.g., one or more optical lenses, diffraction lenses, etc.), or any combination of scanning/spinning/rotating means with any mirrors, prisms and lenses, to change the angle of the light generated by the illumination source. The LIDAR system may further include a pattern provided in the light path of the light generated by the illumination source and configured to reflect at least a portion of the light generated by the illumination source towards at least one of the one or more optical sensors. The LIDAR may system may further include an angle determination unit, configured to determine an angle of the light generated by the illumination source based on at least a portion of the light reflected by the pattern and detected by at least one of the one or more optical sensors. The one or more of a distance to the target object, a velocity of the target object, and a three-dimensional representation of at least a portion of the target object may then be determined based on the determined angle. In various embodiments, the angle determination unit may be a part of the LIDAR controller and/or be communicatively connected to the LIDAR controller.

Other aspects of the present disclosure provide modules and sub-systems, e.g., a LIDAR module (e.g., a LIDAR housing) that includes the pattern as described herein, a LIDAR module that includes the illumination source as described herein and/or the one or more optical sensors as described herein, a LIDAR module that includes the angle determination unit and/or the LIDAR controller as described herein, as well as methods for operating such modules and sub-systems, and methods for determining distance to at least one object using such modules and sub-systems. While some embodiments of the present disclosure refer to scanning LIDAR systems and/or LIDAR systems that use one or more mirrors to change the angle of the light transmitted by the illumination source of a LIDAR system as example systems in which patterns that allow determination of the angle of the light transmitted by a LIDAR illumination source as described herein may be implemented, in other embodiments, such patterns may be implemented in any other LIDAR systems, including LIDAR systems that control the angle of the light generated by the illumination source by electronic means, all of which embodiments being within the scope of the present disclosure.

As will be appreciated by one skilled in the art, aspects of the present disclosure, in particular aspects of patterns that allow determination of the angle of the light generated by a LIDAR illumination source as proposed herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units, despite the fact that, in the interests of brevity, these steps may be described as being performed by an angle determination unit and/or by a LIDAR controller. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing receivers, LIDAR modules, LIDAR systems, and/or their controllers, etc.) or be stored upon manufacturing of these devices and systems.

Other features and advantages of the disclosure will be apparent from the following description and the select examples.

The following detailed description presents various descriptions of specific certain embodiments. However, the innovations described herein can be embodied in a multitude of different ways, for example, as defined and covered by the select examples. In the following description, reference is made to the drawings, where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect connection through one or more passive or active intermediary devices/components. In another example, the term "circuit" means one or more passive and/or active components that are arranged to cooperate with one another to provide a desired function. If used, the terms "substantially," "approximately," "about," etc., may be used to generally refer to being within +/−20% of a target value, e.g., within +/−10% of a target value, based on the context of a particular value as described herein or as known in the art.

Example Arrangements for Determining Angles of Rotation

Figure 2:
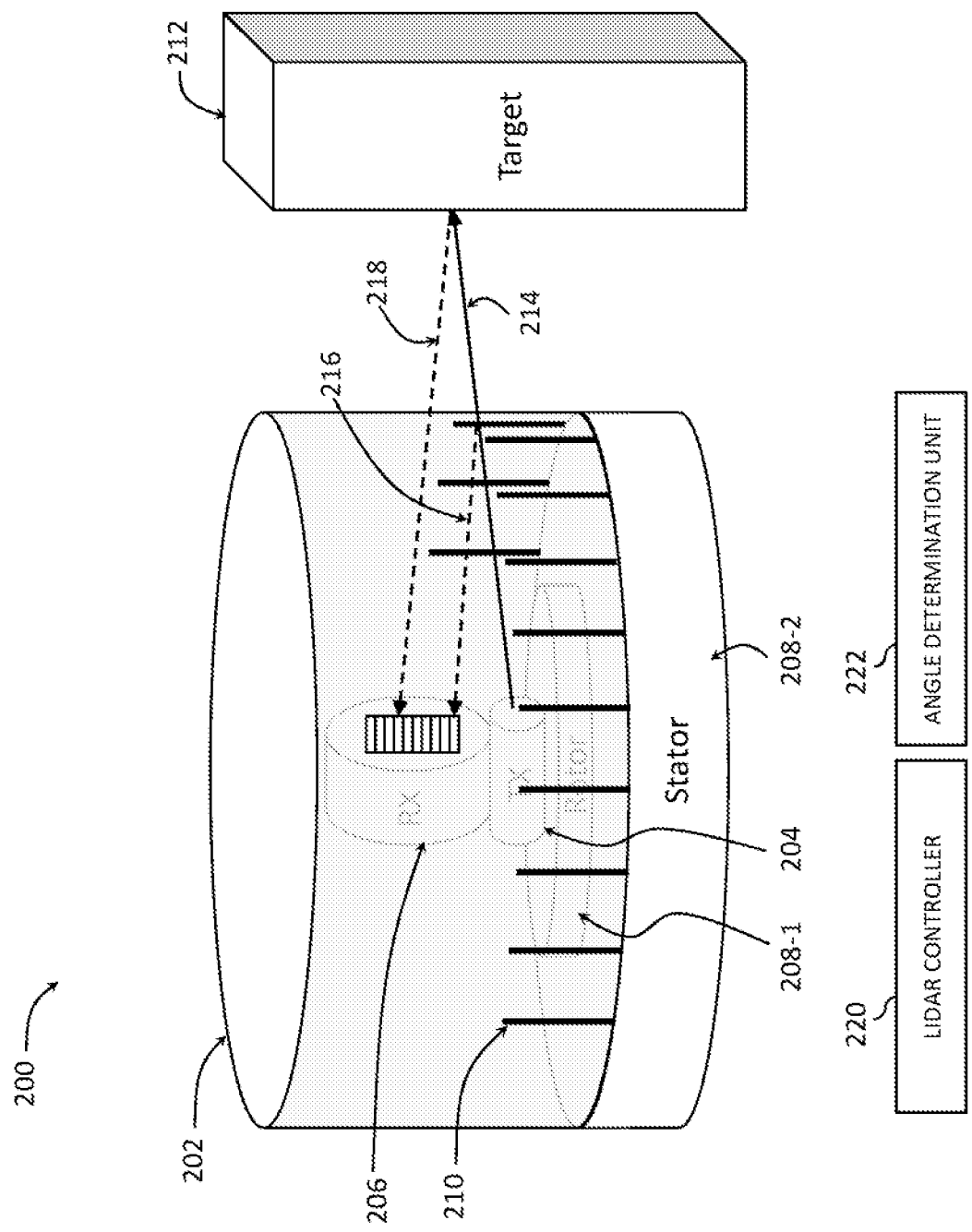
FIG. 2 is a schematic illustration of a first example of a pattern for determining angles of rotation of light transmitted by a scanning LIDAR system, according to some embodiments of the present disclosure.

Embodiments of the present disclosure aim to provide a way to enable a LIDAR system to measure the rotating angle by itself and, possibly, also reduce the angular velocity deviation or reduce the impact thereof on the measurements. In particular, various embodiments are based on providing a pattern in a light path of the light transmitted by a transmitter of the LIDAR system, which pattern may be configured to reflect some of the light transmitted by the transmitter to be incident on a receiver of the LIDAR system. FIG. 2 illustrates one example of such a pattern. In particular, FIG. 2 illustrates a LIDAR system 200 that includes a transmitter labeled as "TX," a receiver labeled as "RX," and some example mechanical means for rotating the transmitter and the receiver to cover a wider FOV. As used herein, unless specified otherwise, in some embodiments, the term "transmitter" may refer only to the illumination source of a LIDAR system, such as, e.g., a laser 920 shown in FIG. 9, while the term "receiver" may refer only to the optical sensor (or an array thereof) of a LIDAR system, such as, e.g., a photodiode 932 shown in FIG. 9. In other embodiments, what is described as a "transmitter" may include further components, e.g., one or more of those of the transmitter signal chain 910, shown in FIG. 9. Similarly, in other embodiments, what is described as a "receiver" may include further components, e.g., one or more of those of the receiver signal chain 930, shown in FIG. 9. In some embodiments, the illumination source and one or more optical sensors of a LIDAR system may be positioned/arranged in a set arrangement with respect to one another, so that they may be rotated together. FIG. 2 and some other figures illustrate a plurality of optical sensors arranged in a certain arrangement/orientation with respect to one another, namely, arranged vertically; however other arrangements of a plurality of optical sensors of a LIDAR receiver are possible and are within the scope of the present disclosure. As known in the art, different optical sensors of an array of optical sensors of a LIDAR receiver may be referred to as "channels."

Figure 9:
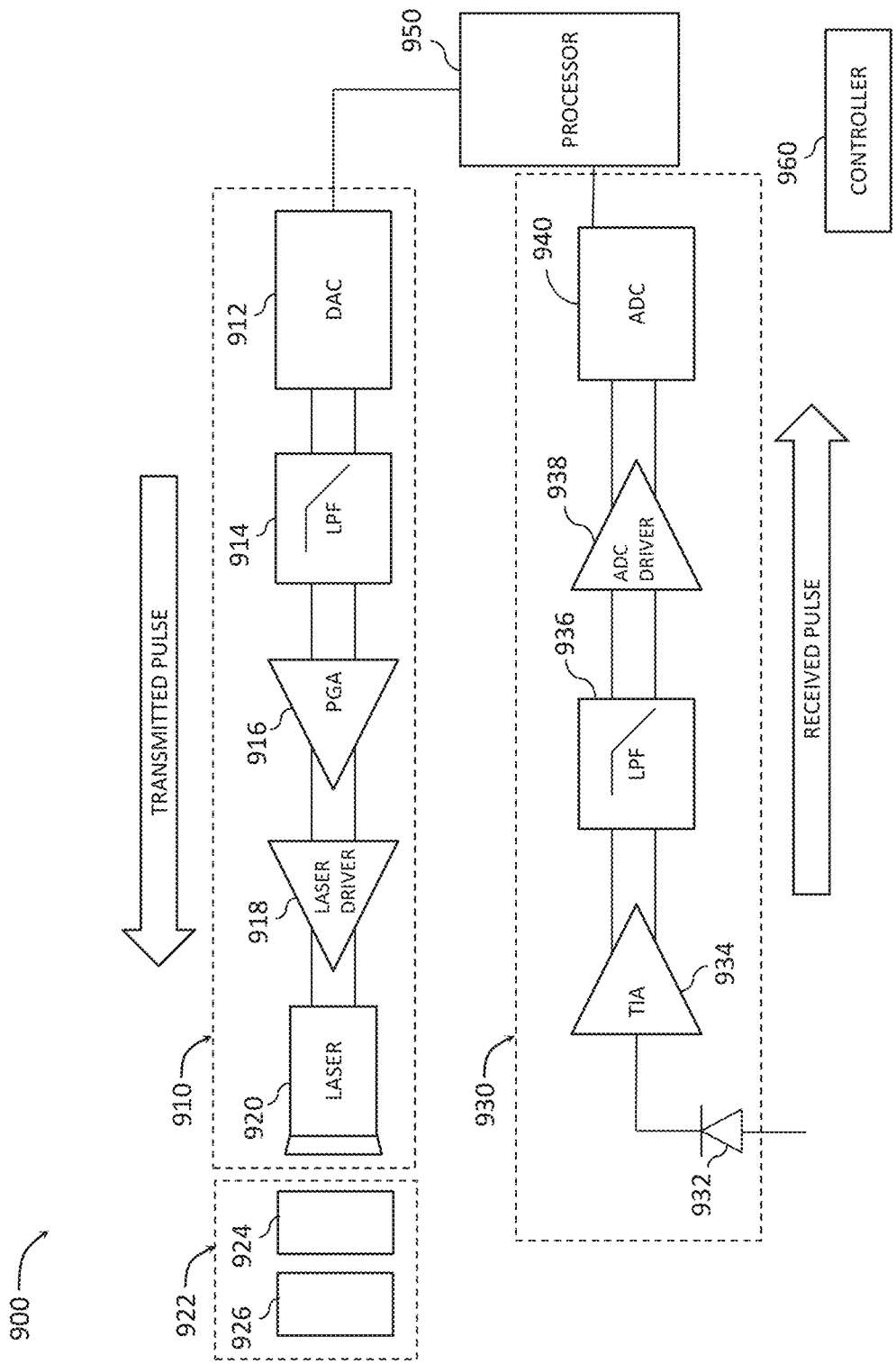
FIG. 9 is a block diagram of an example LIDAR system that may include a scanning LIDAR module having one or more patterns, according to some embodiments of the present disclosure.

Turning to the details of FIG. 2, the LIDAR system 200 is shown to have a LIDAR module that includes an enclosure (e.g., a housing) 202, configured to at least partially surround a transmitter (TX) 204 of the LIDAR system 200 and a receiver (RX) 206 of the LIDAR system 200. The transmitter 204 may include an illumination source, configured to transmit light. For example, the transmitter 204 may include a transmitter signal chain 910, as illustrated in FIG. 9 and described below. The receiver 206 may include a light detector that includes one or more optical sensors configured to detect light incident thereon. For example, the receiver 206 may include a receiver signal chain 930, as illustrated in FIG. 9 and described below.

The LIDAR system 200 may further include an arrangement 208 for rotating the light transmitted by the illumination source of the transmitter 204 to scan objects that would be outside of a FOV of a single light beam. In some embodiments of the LIDAR system 200, the illumination source of the transmitter 204 and the light detector of the receiver 206 may be arranged in fixed positions with respect to one another and a LIDAR controller 220 (e.g., a LIDAR controller 960, illustrated in FIG. 9 and described below) may rotate the arrangement of the illumination source and the light detector up to 360 degrees in order to illuminate the desired FOV and receive light reflected from various objects, such as a target object 212. In such embodiments, the arrangement 208 for rotating the light transmitted by the illumination source of the transmitter 204 may include a rotor 208-1 and a stator 208-2, where the rotor 208-1 may rotate the arrangement of the transmitter 204 and the receiver 206 to illuminate desired FOVs up to 360 degrees. However, in other embodiments, the LIDAR system 200 may include any other an arrangement 208 for rotating the light transmitted by the illumination source of the transmitter 204. For example, the arrangement 208 of the LIDAR system 200 may include a moveable mirror, and the LIDAR controller 220 may move the mirror in order to sweep the pulsed beams of light and illuminate the desired FOV up to 360 degrees. For example, the arrangement 208 may include an arrangement 924, as illustrated in FIG. 9 and described below.

Turning back to the LIDAR module of the LIDAR system 200, the enclosure 202 includes a pattern 210, provided in an optical path of a light transmitted by the illumination source of the transmitter 204 and configured to reflect at least a portion of the light transmitted by the illumination source to be incident on at least one of the one or more optical sensors of the receiver 206. FIG. 2 illustrates a relatively simple example of the pattern 210 by showing the pattern 210 as a comb pattern, where the sticks of the comb are placed uniformly on the enclosure 202 around at least a portion of an arrangement of the transmitter 204 and the receiver 206. In other embodiments, the sticks of the comb of the pattern 210 do not have to be placed uniformly, and/or their shape/height/width may be different from what is shown in FIG. 2 and/or the shape/height/width of any one or more sticks of the comb may be different from that of one or more other stick of the comb. In yet other embodiments, the pattern 210 may include any other shapes or form besides a comb. In general, the pattern 210 may be any pattern that is provided in an optical path of a light transmitted by the illumination source of the transmitter 204 and configured to reflect at least a portion of the light transmitted by the illumination source to be incident on at least one of the one or more optical sensors of the receiver 206 to allow determination of the angle of the light transmitted by the illumination source (e.g., with respect to a certain reference line). The pattern 210 that is shown in FIG. 2 is one example of a pattern 926 shown in FIG. 9.

When the LIDAR system 200 as shown in FIG. 2 starts rotating the light transmitted by the transmitter 204 (said transmitted light illustrated in FIG. 2 with a light beam 214), one of the receiver channels (i.e., one of the optical sensors), of the array of the optical sensors of the LIDAR system 200 can show a relatively high output because it detects a reflection 216 of the transmitted light 214 from the first stick of the comb. In some embodiments, the height of the stick may be selected to be suitable for just reflecting a small part of the light 214 transmitted by the transmitter 204 to be incident on and detected by only one channel (or a subset of channels) of the receiver 206, for all of the sticks of the comb. For example, such a channel may be the lowest optical sensor if the optical sensors are arranged in a vertical stack as schematically illustrated in FIG. 2, and may be referred to as a "flag" indicating that this channel is designated to detect the light reflected from the pattern 210. The remaining portions of the light 214 transmitted by the transmitter 204 can still propagate further to sense the other objects, e.g., to sense the target object 212, shown in FIG. 2, to enable LIDAR measurements from readings of other channels of the receiver 206 because one or more other optical sensors of the receiver 206 detect a reflection 218 of the transmitted light 214 from the target object 212.

Figure 3:
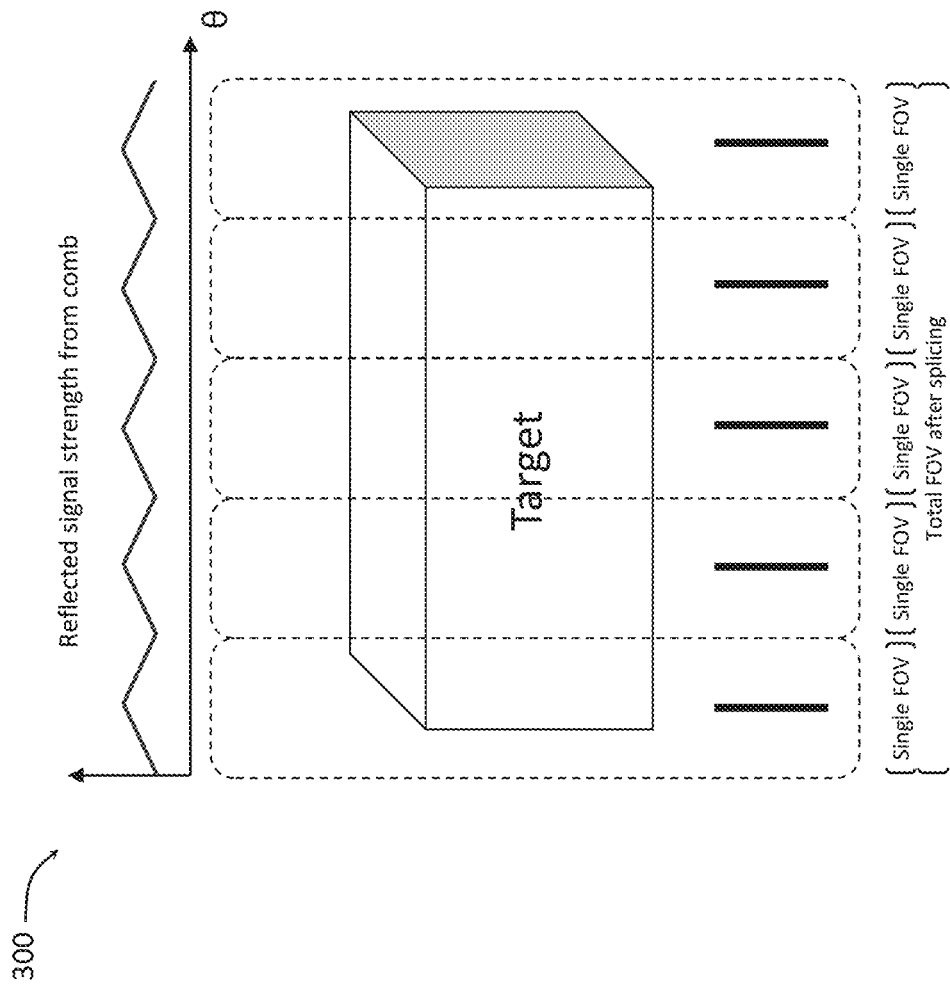
FIG. 3 is a schematic illustration of a reflected signal strength for determining angles of rotation of light transmitted by a scanning LIDAR system using the pattern of FIG. 2, according to some embodiments of the present disclosure.

The relatively high output of the receiver 206 indicative of a reflection of the transmitted light 214 from a portion the pattern 210 can be recorded as, e.g., a logic level "1". When the LIDAR system 200 continues to rotate the transmitted light 214 past the first stick of the comb of the pattern 210 and detects nothing, the output becomes low and may be recorded as, e.g., a logic level "0," and so on, as illustrated in FIG. 3. An angle determination unit 222 of the LIDAR system 200 (which may be, or may be included in, the LIDAR controller 220), e.g., a controller 960 shown in FIG. 9, may then be configured to determine the angle of rotation of the transmitted light 214 of the LIDAR system 200 by decoding 1s and 0s of the readings on the one or more channels configured to receive the light reflected from the pattern 210. Because the other channels in the LIDAR system 200 are still configured to receive reflections from other objects and not the pattern 210 (e.g., can still measure the distance of the objects not affected by the reflections from the sticks of the comb), the distance measured when the "flag" channel's output is "1" can be extracted and spliced together in sequence to get the point cloud with a very wide FOV.

Figure 4:
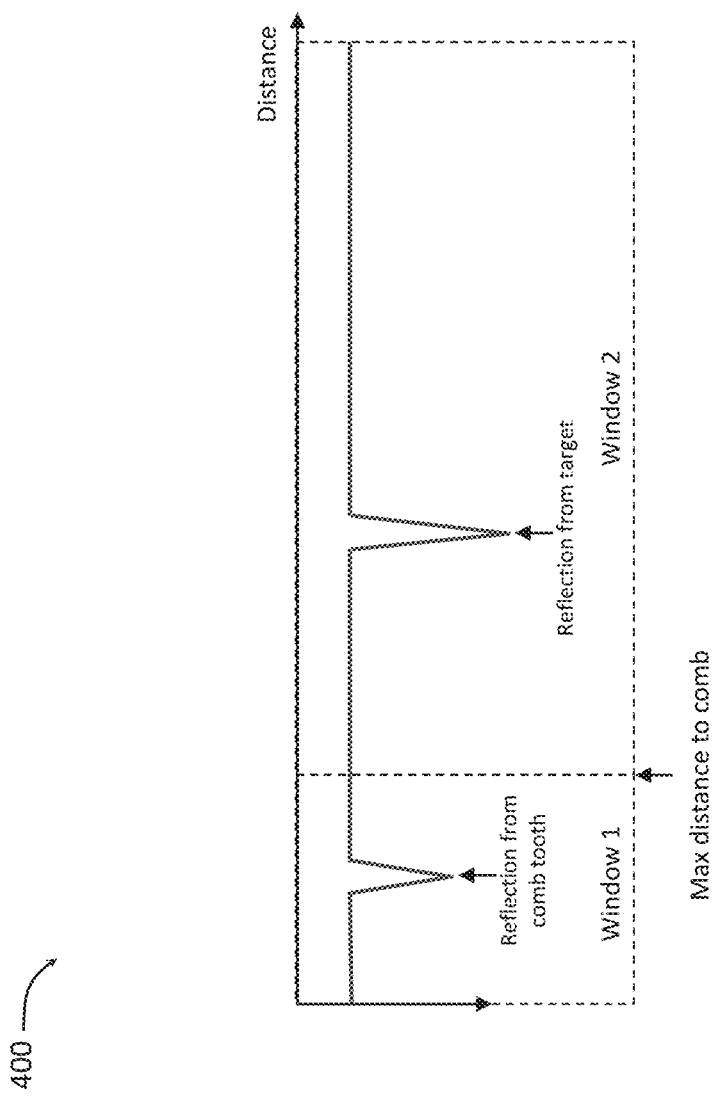
FIG. 4 is a schematic illustration of a windowing technique for determining angles of rotation of light transmitted by a scanning LIDAR system using patterns, according to some embodiments of the present disclosure.

In some implementations, such an approach can encounter a problem of the crosstalk in several RX channels. For example, because the distance between the optical sensors of the different channels can be very small, it may be difficult to make only one channel (e.g., only the lowest channel) to be the "flag". In such implementations, the signals indicative of the light reflected from the sticks can appear in more than one RX channel. In such embodiments, the angle determination unit 222 may employ a windowing technique as shown in FIG. 4, based on time-of-flight (ToF) technique, so each channel's result can be separated by "Stick Window" and "Distance Window" to identify the actual distance of the objects. Because the signal from sticks will appear in the predictable stick window with very small distance, the signal beyond from the stick window can be assumed to be from the target objects. Thus, the influence of both the stick signal and crosstalk on the result of distance measurement may be reduced.

In some embodiments, the sticks of the comb as described above may be implemented in or on the enclosure 202 which may provide a housing that may at least partially surround the transmitter 204 and/or the receiver 206. The sticks of the comb may be just one example of a pattern that may be configured to reflect at least some of the light transmitted by the illumination source of a LIDAR system. In other embodiments, descriptions provided above are applicable to other patterns, some other examples are shown, e.g., in FIGS. 5 and 7.

Figure 5:
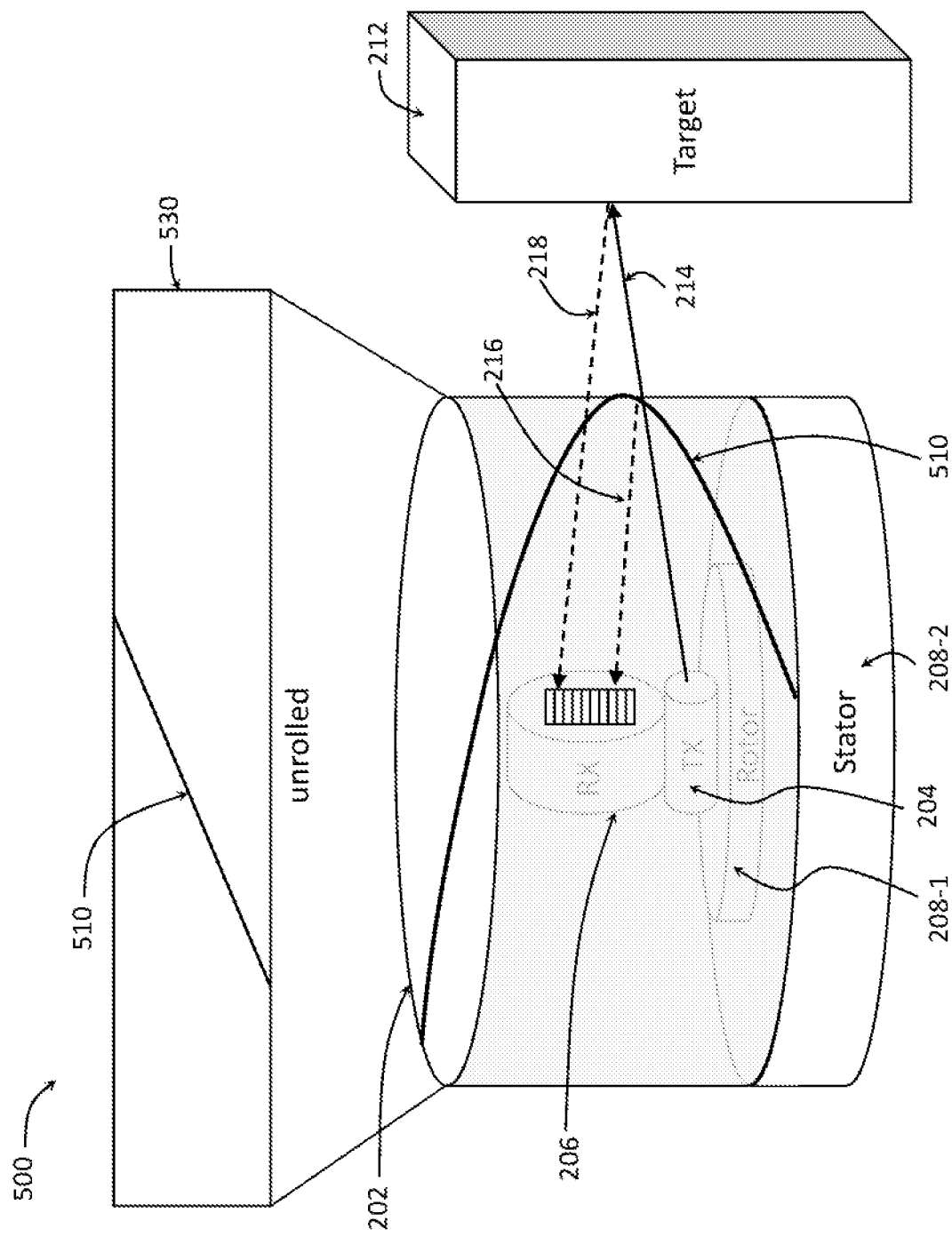
FIG. 5 is a schematic illustration of a second example of a pattern for determining angles of rotation of light transmitted by a scanning LIDAR system, according to some embodiments of the present disclosure.
Figure 7:
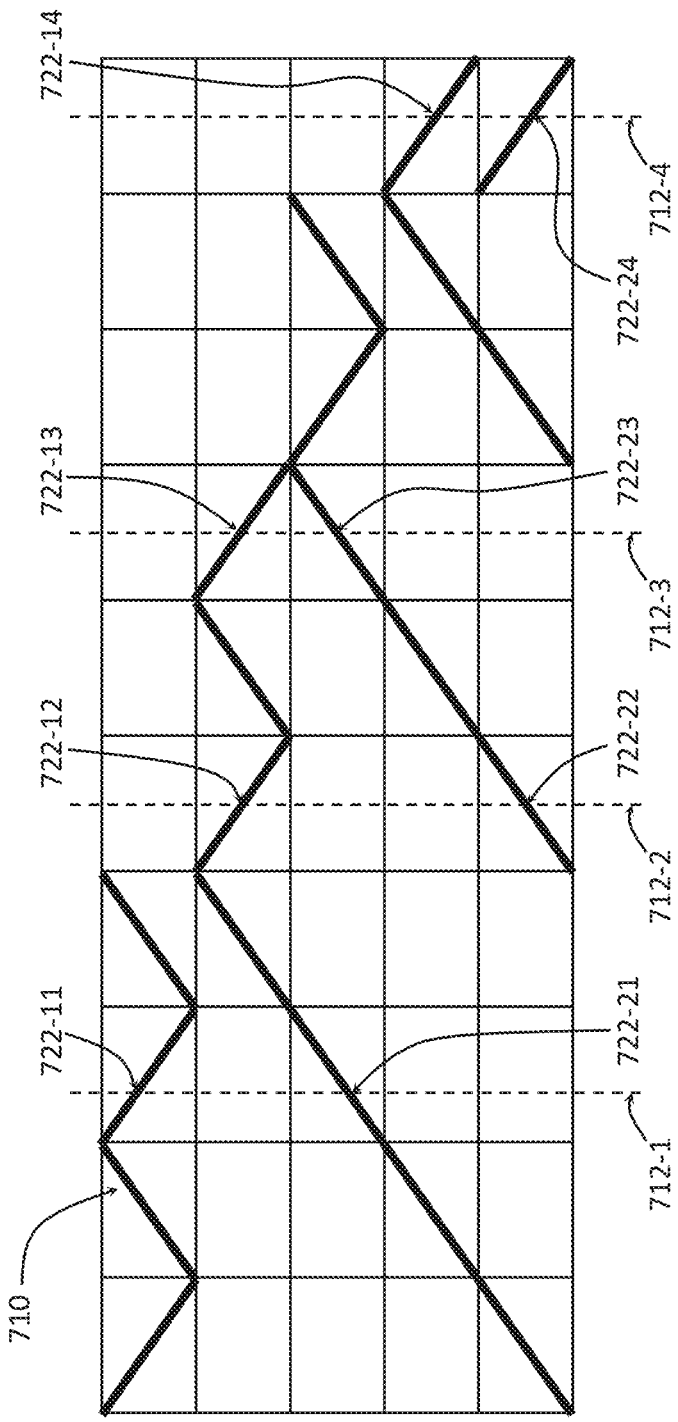
FIG. 7 is a schematic illustration of a third example of a pattern for determining angles of rotation of light transmitted by a scanning LIDAR system, according to some embodiments of the present disclosure.

In general, the features of the patter 210 (e.g., the sticks of the comb of the example pattern 210 shown in FIG. 2 or the lines of the patterns shown in FIGS. 5 and 7) may be implemented as reflective objects (e.g., reflective tape), scratches embedded in the housing/enclosure 202, paint pattern, etch of the antireflecting coating inside or outside the housing, etc. In some embodiments, the features of the pattern 210 may include one or more lines (with the sticks of the comb pattern as shown in FIG. 2 also being an example of such lines), where a width of the lines may be between about 0.1 and 5 millimeters (mm), including all values and ranges therein, e.g., between about 0.1 and 2 mm (e.g., between about 0.1 and 0.2 mm, or between about 0.4 and 0.5 mm).

In general, the pattern 210, e.g., provided on the enclosure 202, may be configured to change at least one parameter of at least a portion of light transmitted by the illumination source towards the enclosure 202 when the portion of light is incident on at least a portion of the pattern 210, to enable the angle determination unit 222 to determine an angle at which the light is transmitted by the illumination source of the transmitter 204. In some embodiments, such at least one parameter may include a direction of propagation of the portion of light. For example, the pattern 210 may be configured to reflect the portion of light incident thereon to be transmitted to at least one of the one or more optical sensors of the receiver 206. In other embodiments, such at least one parameter may include a wavelength of the portion of light. For example, the pattern 210 may include a wavelength-converting material, configured to absorb some of the light incident thereon and re-emit the absorbed energy as light at a different wavelength. In another example, the pattern 210 may include an optical grating or other structure, configured to change the wavelength of the light incident thereon. The angle determination unit 222 can then determine the angle at which the light was transmitted by the illumination source of the transmitter 204 based on at least one of the one or more optical sensors of the receiver 206 detecting light of a different wavelength. In some such embodiments, at least some of the optical sensors of the receiver 206 may be sensors with optical filters, specifically designed to detect the reflection from the features of the pattern 210 (i.e., the optical filters would be centered on the center-wavelength of the changed wavelength configured to be re-emitted by the pattern 210). In still other embodiments, such at least one parameter may include a phase of the portion of light. For example, the pattern 210 may be configured to change the phase of light incident thereon, so that the angle determination unit 222 can determine the angle at which the light was transmitted by the illumination source based on at least one of the one or more optical sensors of the receiver 206 detecting the change in phase.

FIG. 5 is a schematic illustration of a second example of a pattern for determining angles of rotation of a scanning LIDAR module, according to some embodiments of the present disclosure. In particular, FIG. 5 illustrates a LIDAR system 500 that may be substantially analogous to the LIDAR system 200, shown in FIG. 2, described above, except that the example of the comb pattern 210, shown in FIG. 2, is replaced with a spiral pattern 510 in FIG. 5. This, the pattern 510 is another example of the pattern 210, described above.

Figure 6:
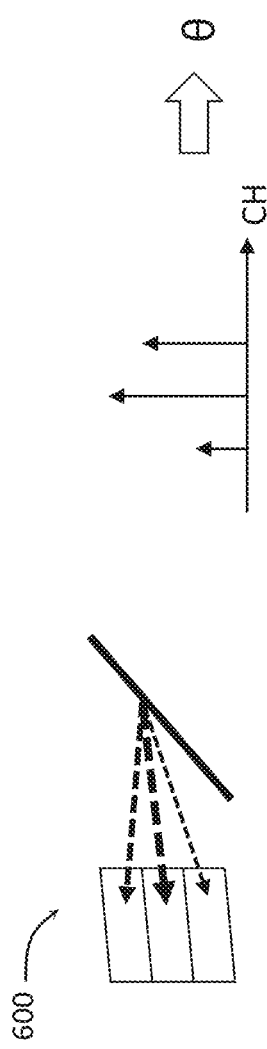
FIG. 6 is a schematic illustration of multiple receiver channels receiving reflections from a pattern for determining angles of rotation of light transmitted by a scanning LIDAR system, according to some embodiments of the present disclosure.

As shown in FIG. 5, in some embodiments, the spiral pattern 510 may be used as a reflective pattern provided on the enclosure 202 in order to enable the angle determination unit 222 to determine the angle of the transmitted light 214. In some embodiments, the spiral pattern 510 may be a linear ramp if the cylindrical housing/enclosure 202 on/over/in which it may be provided is unrolled, as is illustrated in the inset 530 of FIG. 5. In such embodiments, as illustrated in FIG. 6, at any angle θ of the transmitted light 214, due to the elevation of the pattern 510, one of the vertically aligned channels/optical sensors of the receiver 206 may receive stronger reflections than other. The angle determination unit 222 may use relative signal strength between adjacent channels to interpolate. Signal strength in each channel can be obtained also from the ToF windowing technique, described above.

FIG. 7 is a schematic illustration of a third example of a pattern 710 for determining the angles of the transmitted light 214 of a scanning LIDAR system such as the system 200, according to some embodiments of the present disclosure. The pattern shown in FIG. 7 may be included on/over/in the housing/enclosure 202 surrounding the transmitter and receiver arrangement, as shown in FIGS. 2 and 5. The pattern 710 is illustrated in FIG. 7 as thick black lines, with a grid illustrated as a background. FIG. 7 illustrates multi-channel encoding, in particular, an example of 2-channel encoding, because at each vertical cross-section (e.g., at each vertical cross-section of the enclosure 202 with the pattern 710), the pattern 710 includes two separate points, arranged at a certain distance from one another, which may reflect the transmitted light 214 towards two different channels of the receiver 206. For example, at a first example cross-section, illustrated in FIG. 7 with a dashed line 712-1, the pattern 710 includes a first point 722-11 and a second point 722-21; at a second example cross-section, illustrated in FIG. 7 with a dashed line 712-2, the pattern 710 includes a first point 722-12 and a second point 722-22; at a third example cross-section, illustrated in FIG. 7 with a dashed line 712-3, the pattern 710 includes a first point 722-13 and a second point 722-23; and at a fourth example cross-section, illustrated in FIG. 7 with a dashed line 712-4, the pattern 710 includes a first point 722-14 and a second point 722-24.

The embodiment shown in FIG. 7 may help achieve finer angular resolution because more channels can be used, and interpolation between the channels may be performed, to determine the angle of the light 214 transmitted by the illumination source of the transmitter 204. In other embodiments, a pattern may include any other number of such lines, in any desired shapes, to obtain the desired angular resolution. In general, for N channels of the LIDAR receiver 206 (e.g., if the number of the optical sensors of the receiver 206 is N, where N may be any integer greater than 1), k-channel encoding may be used, where k is any integer smaller than N. For example, the receiver 206 may include a plurality of optical sensors, and the pattern 210 may include includes a first sub-pattern/feature (e.g., a first line) and a second sub-pattern/feature (e.g., a second line), where the first sub-pattern is configured to reflect a first portion of the light transmitted by the illumination source to be detected by a first optical sensor of the plurality of optical sensors, the second sub-pattern is configured to reflect a second portion of the light transmitted by the illumination source to be detected by a second optical sensor of the plurality of optical sensors, and the angle determination unit 222 is configured to determine the angle based on the light detected by the first and second optical sensors. In some such embodiments, the first sub-pattern/feature may be discontinuous from the second sub-pattern/feature.

Figure 8:
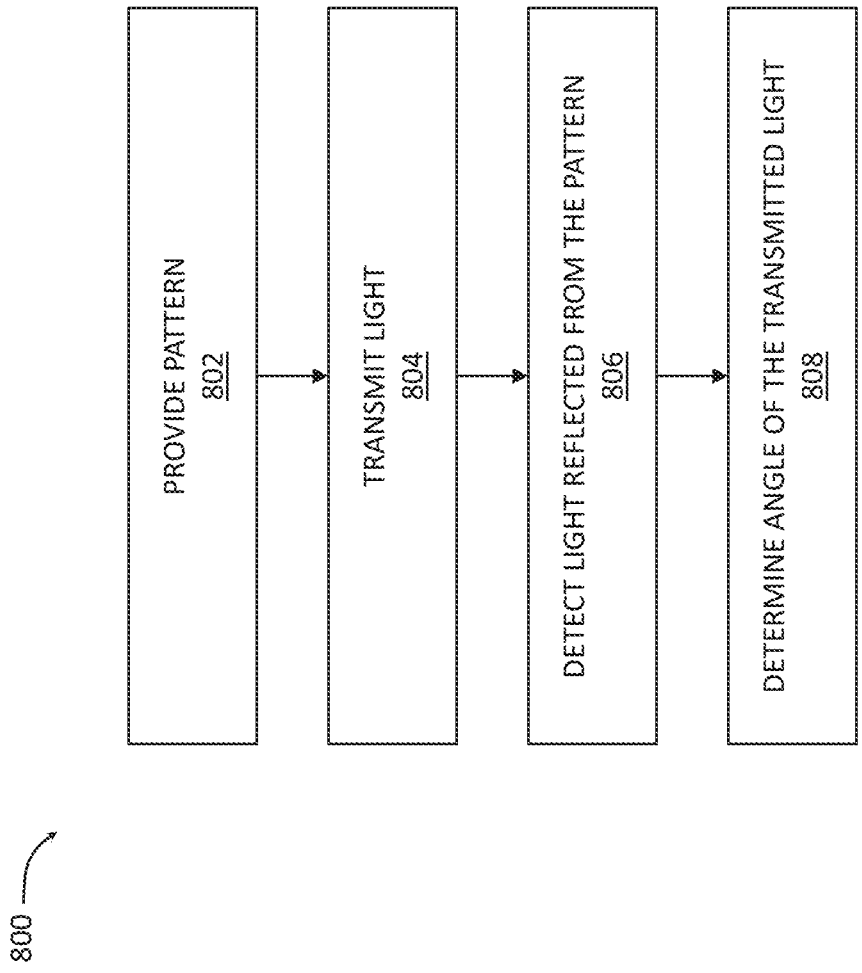
FIG. 8 is a flow diagram of a method for using a scanning LIDAR module having one or more patterns, according to some embodiments of the present disclosure.

FIG. 8 is a flow diagram of a method 800 for using a scanning LIDAR module having one or more patterns 210 provided over the enclosure 202, according to some embodiments of the present disclosure. The method 800 may begin with 802 that includes providing a pattern in an optical path of the light to be transmitted by an illumination source of a LIDAR system. In 804, the method 800 may include the illumination source of the LIDAR system transmitting light, and, in 806, a portion of the light transmitted in 804 may be reflected from the pattern and the reflected light may be detected by at least one of the optical sensors of the LIDAR RX. The method 800 may then proceed with 808 which includes an angle determination unit (e.g., a LIDAR controller) determining the angle of the light transmitted in 804 based on the reflection detected in 806.

Example Systems and Devices

As described above, patterns that allow determination of the angle of the light generated by a LIDAR illumination source as described herein may be used in various LIDAR systems. FIG. 9 is a block diagram of an example laser range finding, e.g., LIDAR, system 900 according to some embodiments of the present disclosure. As shown in FIG. 9, system 900 may include a transmitter signal chain 910, an optical setup 922, a receiver signal chain 930, a processor 950, and a controller 960. In some instances, the receiver signal chain 930 can be implemented separately from the transmitter signal chain 910. As shown in FIG. 9, the transmitter signal chain 912 may include a digital-to-analog converter (DAC) 912, a low pass filter (LPF) 914, a programmable gain amplifier (PGA) 916, a laser driver 918, and a laser 920. The receiver chain 930 may include an optical sensor, e.g., a photodiode (PD) 932, a transimpedance amplifier (TIA) 934, an LPF 936, an analog-to-digital converter (ADC) driver 938, and an ADC 940. In some instances, a receiver chain can include a PGA coupled between the TIA 934 and the LPF 936. Such a PGA could be implemented in place of or in addition to the ADC driver 938. In some instances, the receiver chain 930 may include a plurality of optical sensors 932.

The processor 950 may be configured to generate a digital signal indicating that a laser pulse is to be emitted by the laser 920. The digital signal from the processor 950 may then be converted to an analog signal by the DAC 912, further processed by the optional LPF 914, amplified by the PGA 916, and provided to the laser driver 918. In some embodiments, the laser 920 may be a laser diode, e.g., an inductive resonant laser diode.

The optical setup 922 may include an arrangement 924 for changing the angle of light emitted by the laser 920. In some embodiments, the arrangement 924 may include means for changing the angle mechanically, e.g., the arrangement 924 may include a platform or some other means for spinning/rotating the laser 920, and/or one or more mirrors, the position/orientation of which may be controlled to change the angle. In other embodiments, the arrangement 924 may include means for changing the angle electronically, e.g., using beam steering. As shown in FIG. 9, the optical setup may further include a pattern 926 for reflecting at least a portion of light emitted by the laser 920 towards at least one of the optical sensors 932. The pattern 926 may include any embodiment of any of the patterns for determining the angle of the light generated by the laser 920, as described herein.

The light generated by the laser 920 can reach an object or a target and reflected light can be received by the optical sensor 932 of the receiver signal chain 930. At least a portion of the light generated by the laser 920 can reach the pattern 926 and be reflected by the pattern 926 to be received by the optical sensor 932. Thus, the reflected light can be detected at the optical sensor 932. The optical sensor 932 can be an avalanche photodiode (APD), for example. The optical sensor 932 can generate a current pulse indicative of the received reflected light and the current pulse may be converted to a voltage pulse by the TIA 934 and, optionally, further processed by the LPF 936. The LPF 936 can be a tunable filter in certain embodiments. As illustrated, the LPF 936 may be coupled in a signal path between the TIA 934 and the ADC driver 938. In some other implementations, the LPF 936 can be coupled in a signal path between the ADC driver 938 and the ADC 940. The ADC driver 938 generate a drive signal, based on the output of the TIA 934, to drive the ADC 940. The ADC 940 can convert the received drive signal to a digital signal, to further be processed by the processor 950.

In some embodiments, the processor 950 can be a hardware processor. In some embodiments, the processor 950 can be a baseband digital signal processor. In some embodiments, the processor 950 can determine a distance between an object and the laser range finding system 900. In some embodiments, the processor 950 can output a signal indicative of the determined distance. In some embodiments, the processor 950 can identify an object from which the pulse of light reflected from the object based at least partly on the width of a pulse generated by the TIA 934. In some embodiments, the processor 950 can output data identifying the object. In some embodiments, one instance of the processor 950 may be associated with the receiver signal chain 930 and another instance of the processor 950 may be associated with the transmitter signal chain 910.

The controller 960 may be used to control aspects of the system 900, and, in particular, aspects of the present disclosure related to using the pattern 926 to determine the angle of light emitted by the laser 920. For example, the controller 960 may generate control signals that control operation of various elements of the LIDAR system 900 as described herein, and may determine the angle of light emitted by the laser 920 based on the light detected by the one or more of the optical sensors 932. In some embodiments, the controller 960 may be implemented within, or combined with, the processor 950. In some embodiments, the controller 960 and/or the processor 950 may be implemented as a data processing system shown in FIG. 10.

Figure 10:
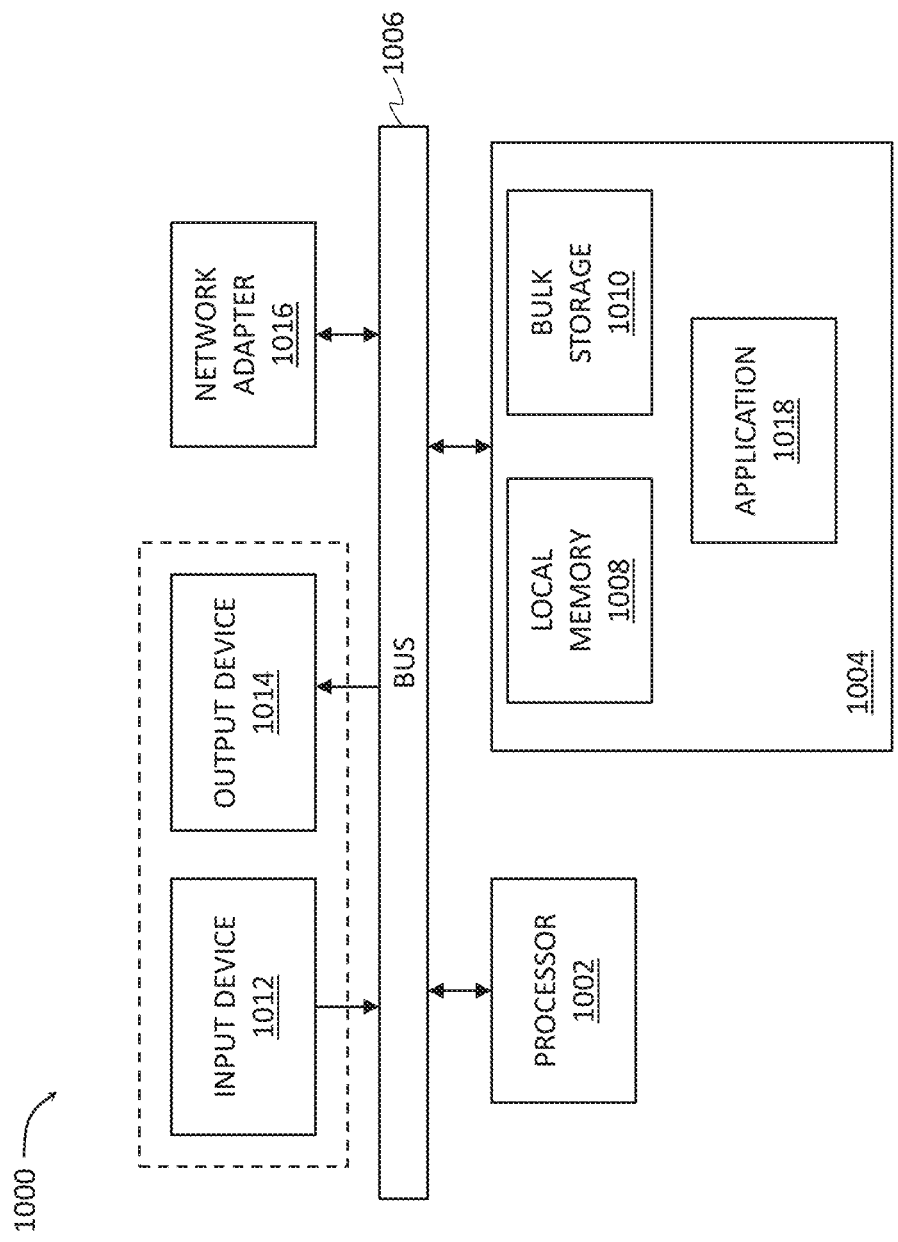
FIG. 10 provides a block diagram illustrating an example data processing system that may be configured to implement, or control, at least portions of processing a received signal using a scanning LIDAR module having one or more patterns, according to some embodiments of the present disclosure.

FIG. 10 provides a block diagram illustrating an example data processing system 1000 that may be configured to implement, or control, at least portions of implementing a LIDAR system that uses patterns that allow determination of the angle of the light generated by a LIDAR illumination source, according to some embodiments of the present disclosure. In some embodiments, the controller 960 and/or the processor 950 may be implemented as the data processing system 1000.

As shown in FIG. 10, the data processing system 1000 may include at least one processor 1002, e.g. a hardware processor 1002, coupled to memory elements 1004 through a system bus 1006. As such, the data processing system may store program code within memory elements 1004. Further, the processor 1002 may execute the program code accessed from the memory elements 1004 via a system bus 1006. In one aspect, the data processing system may be implemented as a computer that is suitable for storing and/or executing program code. It should be appreciated, however, that the data processing system 1000 may be implemented in the form of any system including a processor and a memory that is capable of performing the functions described within this disclosure.

In some embodiments, the processor 1002 can execute software or an algorithm to perform the activities as discussed in the present disclosure, in particular activities related to using patterns to determine the angle of the light generated by a LIDAR illumination source as described herein. The processor 1002 may include any combination of hardware, software, or firmware providing programmable logic, including by way of non-limiting example a microprocessor, a digital signal processor (DSP), a field programmable gate array (FPGA), a programmable logic array (PLA), an application specific integrated circuit (IC) (ASIC), or a virtual machine processor. The processor 1002 may be communicatively coupled to the memory element

1004, for example in a direct-memory access (DMA) configuration, so that the processor 1002 may read from or write to the memory elements 1004.

In general, the memory elements 1004 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 1000 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any of the circuits/components shown in FIGS. 1-9 and FIG. 11, can also include suitable interfaces for receiving, transmitting, and/or otherwise communicating data or information in a network environment so that they can communicate with, e.g., the data processing system 1000 of another one of these elements.

In certain example implementations, mechanisms related to using patterns to determine the angle of the light generated by a LIDAR illumination source as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 1004 shown in FIG. 10, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 1002 shown in FIG. 10, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 1004 may include one or more physical memory devices such as, for example, local memory 1008 and one or more bulk storage devices 1010. The local memory may refer to RAM or other non-persistent memory device(s) generally used during actual execution of the program code. A bulk storage device may be implemented as a hard drive or other persistent data storage device. The processing system 1000 may also include one or more cache memories (not shown) that provide temporary storage of at least some program code in order to reduce the number of times program code must be retrieved from the bulk storage device 1010 during execution.

As shown in FIG. 10, the memory elements 1004 may store an application 1018. In various embodiments, the application 1018 may be stored in the local memory 1008, the one or more bulk storage devices 1010, or apart from the local memory and the bulk storage devices. It should be appreciated that the data processing system 1000 may further execute an operating system (not shown in FIG. 10) that can facilitate execution of the application 1018. The application 1018, being implemented in the form of executable program code, can be executed by the data processing system 1000, e.g., by the processor 1002. Responsive to executing the application, the data processing system 1000 may be configured to perform one or more operations or method steps described herein.

Input/output (I/O) devices depicted as an input device 1012 and an output device 1014, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 1014 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 1014. Input and/or output devices 1012, 1014 may be coupled to the data processing system either directly or through intervening I/O controllers.

In an embodiment, the input and the output devices may be implemented as a combined input/output device (illustrated in FIG. 10 with a dashed line surrounding the input device 1012 and the output device 1014). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1016 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 1000, and a data transmitter for transmitting data from the data processing system 1000 to said systems, devices and/or networks. Modems, cable modems, and Ethernet cards are examples of different types of network adapter that may be used with the data processing system 1000.

Figure 11:
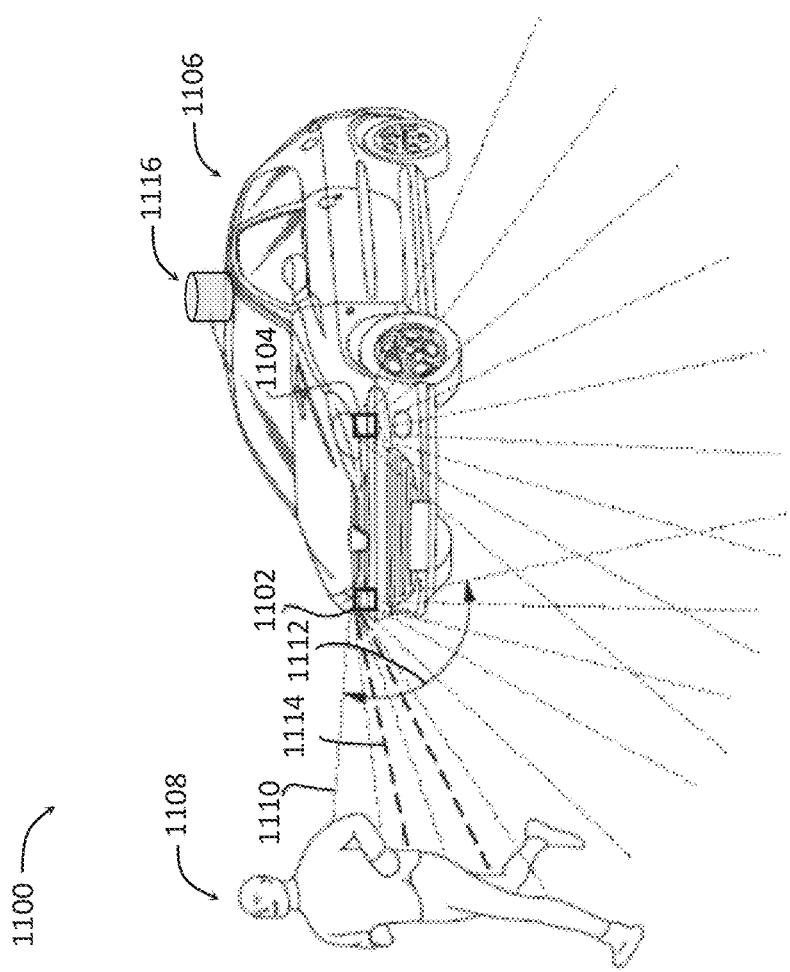
FIG. 11 is an example illustration of a LIDAR system integrated with an automobile, according to some embodiments of the present disclosure.

FIG. 11 shows a LIDAR system integrated with an automobile. This is just one example application in which patterns that allow determination of the angle of the light generated by a LIDAR illumination source discussed herein can be implemented. FIG. 11 illustrates three LIDAR systems, LIDAR systems 1102, 1104, and 1116, integrated with an automobile 1106. The first LIDAR system 1102 may be positioned near a right headlight of the automobile 1106, the second LIDAR system 1104 may be positioned near the left headlight of the automobile 1106, and the third LIDAR system 1116 may be positioned near the top (e.g., on the roof) of the automobile 1106. One or more of the LIDAR systems 1102, 1104, and/or 1116 can implement any suitable principles of using patterns to determine the angle of the light generated by the LIDAR illumination source, as discussed herein. The LIDAR systems 1102, 1104, and/or 1116 can detect a distance between the automobile 1106 and an object 1108.

As illustrated, a transmitter of the LIDAR system 1102 can transmit pulses of light 1110 at an angle 1112. At least some of the pulses of light 1110 may be generated by a laser diode, e.g., the laser diode 920. The transmitted light 1110 can travel through the air and reach the object 1108. The object 1108 can reflect back pulses of light 1114 to a receiver of the LIDAR system 1102. Embodiments discussed herein can generate information to identify the object 1108. The pulses of light 1110 can be transmitted three dimensionally to obtain three-dimensional information of the surroundings.

One or more additional LIDAR systems can be integrated with the automobile 1106 to cover a wider range of area for detection and/or to obtain additional information regarding a selected area. In some embodiments, data collected by each LIDAR system can be combined to analyze information from a wider range of area and/or to provide additional information about a selected area. In some embodiments, the angle 1112 can be adjusted and the angle 1112 can be in any suitable range.

SELECT EXAMPLES

Systems and methods for determining an angle of the light transmitted by an illumination source of a scanning LIDAR system have been disclosed herein. An example LIDAR system includes a pattern, provided in an optical path of the light generated by the illumination source as the light is transmitted out of the system, and configured to reflect at least a portion of the transmitted light to be incident on at least one of one or more optical sensors of the LIDAR system. The LIDAR system further includes, or is associated with, an angle determination unit, configured to determine an angle of the transmitted light based on a light detected by at least one of the optical sensors, where at least a portion of the light detected by the optical sensor(s) includes at least a portion of the light generated by the illumination source and reflected by the pattern The following paragraphs provide various examples of the embodiments disclosed herein.

Example A1 provides a LIDAR system, the LIDAR system including an illumination source; one or more optical sensors; a pattern, provided in an optical path of a light emitted by the illumination source and configured to reflect at least a portion of the light generated by the illumination source to be incident on at least one of the one or more optical sensors; and an angle determination unit configured to determine an angle of the light generated by the illumination source based on a light detected by at least one of the one or more optical sensors, where at least a portion of the light detected by the at least one of the one or more optical sensors includes at least a portion of the light generated by the illumination source and reflected by the pattern.

Example A2 provides the LIDAR system according to example A1, where at least one of the one or more optical sensors is configured to receive at least a portion of the light generated by the illumination source and reflected by a target object, and the angle determination unit is further configured to determine one or more of a distance to the target object, a velocity of the target object, and a three-dimensional representation of at least a portion of the target object based on the angle and based on the portion of the light generated by the illumination source and reflected by the target object.

Example A3 provides the LIDAR system according to examples A1 or A2, where the pattern at least partially surrounds the illumination source and the one or more optical sensors.

Example A4 provides the LIDAR system according to any one of the preceding examples A, where the pattern includes a plurality of reflective elements.

Example A5 provides the LIDAR system according to any one of the preceding examples A, where the pattern includes at least one continuous line (which may, but does not have to be, a straight line).

Example A6 provides the LIDAR system according to example A5, where the line at least partially surrounds the illumination source and the one or more optical sensors.

Example A7 provides the LIDAR system according to any one of the preceding examples A, where the one or more optical sensors include a plurality of optical sensors, and where the pattern is configured to reflect a first portion of the light generated by the illumination source to be detected by a first optical sensor of the plurality of optical sensors and reflect a second portion of the light generated by the illumination source to be detected by a second optical sensor of the plurality of optical sensors. For example, the pattern may include a first sub-pattern (e.g., a first line) and a second sub-pattern (e.g., a second line), the first sub-pattern may be configured to reflect a first portion of the light transmitted by the illumination source to be detected by a first optical sensor of the plurality of optical sensors, the second sub-pattern may be configured to reflect a second portion of the light transmitted by the illumination source to be detected by a second optical sensor of the plurality of optical sensors, and the angle determination unit may be configured to determine the angle based on the light detected by the first and second optical sensors.

Example A8 provides the LIDAR system according to example A7, where the angle determination unit is configured to determine the angle based on the light detected by the first and second optical sensors.

Example A9 provides the LIDAR system according to any one of the preceding examples A, where the pattern includes a plurality of reflective objects located at predetermined locations with respect to the light generated by the illumination source.

Example A10 provides the LIDAR system according to any one of the preceding examples A, further including a mirror configured to change the angle of the light generated by the illumination source.

Example A11 provides the LIDAR system according to any one of the preceding examples A, where the one or more optical sensors are placed at a predefined position/orientation with respect to the illumination source (which predetermined position/orientation may be known to the LIDAR controller).

Example A12 provides the LIDAR system according to any one of the preceding examples A, where the one or more optical sensors include a plurality of optical sensors at predefined positions/orientations with respect to one another (which positions/orientations may be known to the angle determination unit, e.g., by being known to a LIDAR controller of the LIDAR system).

Example A13 provides the LIDAR system according to any one of the preceding examples A, where the illumination source and the one or more optical sensors are included in scanning LIDAR module.

Example A14 provides a pattern for use in the LIDAR system according to any one of the preceding examples A. In various embodiments, the pattern may include one or more lines, where a width of each of the lines may be between about 0.1 and 5 millimeters.

Example A15 provides an angle determination unit and/or a LIDAR controller for use in the LIDAR system according to any one of the preceding examples A.

Example A16 provides a computer program product or a non-transitory computer-readable storage medium, storing instructions for configuring the LIDAR controller to at least determine the angle in the LIDAR system according to any one of the preceding examples A.

Example A17 provides the computer program product or the non-transitory computer-readable storage medium according to example A16, for further configuring the LIDAR controller to be used in the LIDAR system according to any one of the preceding examples A.

Example A18 provides a LIDAR module, including the one or more optical sensors and the pattern for use in the LIDAR system according to any one of the preceding examples A.

Example A19 provides the LIDAR module according to example A18, further including the illumination source.

Example A20 provides the LIDAR module according to examples A18 or 19, further including the LIDAR controller.

Other Implementation Notes, Variations, and Applications

Principles and advantages discussed herein can be used in any device where the angle of the light generated by a LIDAR system may need to be determined. For example, aspects of this disclosure can be implemented in various range finding systems. For example, aspects of this disclosure can be implemented in any suitable LIDAR system such as, for example, automotive LIDAR, industrial LIDAR, space LIDAR, military LIDAR, etc. LIDAR systems can include a receiver or a transmitter and a receiver. LIDAR systems can be integrated with a vehicle, such as an automobile, a drone such as an unmanned flying machine, an autonomous robot, or a space vehicle. LIDAR systems can transmit and/o receive laser light. LIDAR systems can be used for three-dimensional sensing applications. LIDAR systems can be used with augmented reality technology. Moreover, aspects of this disclosure can be implemented in various electronic devices. Examples of the electronic devices can include, but are not limited to, electronic products, parts of electronic products such as integrated circuits, vehicular electronics such as automotive electronics, etc. Further, the electronic devices can include unfinished products.

While certain embodiments have been described, these embodiments have been presented by way of example, and are not intended to limit the scope of the disclosure. For example, while some embodiments refer to an APD being coupled to an input port of a TIA, these embodiments are equally applicable to any other device that can generate current pulses to be provided to an input of a TIA, e.g., to any other type of a PD or, more generally, an optical sensor. In another example, while some embodiments may refer to a PD that sinks current from the TIA, these embodiments may be modified, in a way that would be obvious to a person of ordinary skill in the art, to a PD that sources current to the TIA, all of which embodiments being, therefore, within the scope of the present disclosure. Indeed, the novel methods, apparatus, and systems related to using patterns to determine the angle of the light generated by a LIDAR illumination source, described herein, may be embodied in a variety of other forms. Furthermore, various omissions, substitutions and changes in the form of the methods, apparatus, and systems described herein may be made without departing from the spirit of the disclosure. For example, circuit blocks and/or circuit elements described herein may be deleted, moved, added, subdivided, combined, and/or modified. Each of these circuit blocks and/or circuit elements may be implemented in a variety of different ways. The accompanying claims and their equivalents are intended to cover any such forms or modifications as would fall within the scope and spirit of the disclosure.

Any of the principles and advantages discussed herein can be applied to other systems, devices, integrated circuits, electronic apparatus, methods, not just to the embodiments described above. The elements and operations of the various embodiments described above can be combined to provide further embodiments. The principles and advantages of the embodiments can be used in connection with any other systems, devices, integrated circuits, apparatus, or methods that could benefit from any of the teachings herein.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, controllers for configuring any of the components, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), FPGAs, and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to some non-limiting examples and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in the present disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended select examples. Note that all optional features of the apparatus described above may also be implemented with respect to the method or process described herein and specifics in the examples may be used anywhere in one or more embodiments.

The invention claimed is:

1. A light detection and ranging (LIDAR) system, comprising:
    an illumination source;
    an array of optical sensors configured to detect light incident thereon;
    a pattern of reflective elements, the pattern arranged at least partially in a cross section of an optical path of a beam of light transmitted by the illumination source such that a portion of the beam of light transmitted by the illumination source is reflected by the pattern of reflective elements to be incident on at least one of the array of optical sensors and a second portion of the beam of light is reflected by a target object to be incident on the at least one of the array of optical sensors; and
    one or more processors configured to measure, based on the portion of the beam of light that is incident on the at least one of the array of optical sensors, an angle of the beam of light transmitted by the illumination source, wherein the one or more processors are configured to measure the angle of the beam of light based at least in part on interpolating a relative signal strength of the beam of light at each of multiple optical sensors in the array of optical sensors.

2. The LIDAR system according to claim 1, wherein the one or more processors being further configured to determine one or more of a distance to the target object, a velocity of the target object, or a three-dimensional representation of at least a portion of the target object based on the second portion of the beam of light transmitted by the illumination source and reflected by the target object.

3. The LIDAR system according to claim 1, wherein the pattern at least partially surrounds the illumination source and the array of optical sensors.

4. The LIDAR system according to claim 1, wherein the pattern includes at least one continuous reflective line.

5. The LIDAR system according to claim 4, wherein a first reflective line of the at least one continuous reflective line at least partially surrounds the illumination source and the array of optical sensors.

6. The LIDAR system according to claim 1, wherein the pattern is configured to reflect at least the portion of the beam of light transmitted by the illumination source to be incident on a first optical sensor of the array of optical sensors and further configured to reflect a third portion of the beam of light transmitted by the illumination source to be incident on a second optical sensor of the array of optical sensors.

7. The LIDAR system according to claim 1, wherein:
    the pattern includes a first sub-pattern and a second sub-pattern,
    the first sub-pattern is configured to reflect at least the portion of the beam of light transmitted by the illumination source to be incident on a first optical sensor of the array of optical sensors,
    the second sub-pattern is configured to reflect a third portion of the beam of light transmitted by the illumination source to be incident on a second optical sensor of the array of optical sensors, and
    the one or more processors further configured to measure the angle based on the respective portion of the beam of light incident on the first optical sensor and the second optical sensor.

8. The LIDAR system according to claim 7, wherein the first sub-pattern is discontinuous from the second sub-pattern.

9. The LIDAR system according to claim 1, wherein the reflective elements in the pattern of reflective objects are located at respective different locations with respect to the beam of light transmitted by the illumination source.

10. The LIDAR system according to claim 1, further comprising a mirror configured to change the angle of the beam of light transmitted by the illumination source.

11. The LIDAR system according to claim 1, wherein the array of optical sensors are placed at a predefined position with respect to the illumination source.

12. The LIDAR system according to claim 1, wherein the array of optical sensors are placed at respective predefined positions with respect to one another.

13. The LIDAR system according to claim 1, wherein the illumination source and the array of optical sensors are included in a scanning LIDAR module.

14. The LIDAR system according to claim 1, wherein the one or more processors are configured to detect, using a time-of-flight technique, at least the portion of the beam of light received by the multiple optical sensors as reflected by the pattern.

15. The LIDAR system according to claim 1, wherein the array of optical sensors are vertically aligned with respect to an angle of the beam of light in a housing of the LIDAR system.

16. The LIDAR system according to claim 1, wherein the one or more processors being further configured to:
 determine a distance to the target object based on the second portion of the beam of light transmitted by the illumination source and reflected by the target object;
 determine a second distance to the target object based on a third portion of the beam of light transmitted by the illumination source and reflected by the target object; and
 splice the distance and the second distance together in sequence to obtain a point cloud.

\* \* \* \* \*